(12) United States Patent
Ollgaard et al.

(10) Patent No.: US 9,657,717 B2
(45) Date of Patent: May 23, 2017

(54) WIND TURBINE TOWER HAVING A DAMPER

(71) Applicant: Vestas Wind Systems A/S, Aarhus N. (DK)

(72) Inventors: Borge Ollgaard, Esbjerg (DK); Soren P. Jensen, Varde (DK)

(73) Assignee: Vestas Wind Systems A/S, Aarhus N. (DK)

(*) Notice: Subject to any disclaimer, the term of this patent is extended or adjusted under 35 U.S.C. 154(b) by 0 days.

(21) Appl. No.: 14/897,825

(22) PCT Filed: Jun. 11, 2014

(86) PCT No.: PCT/DK2014/050164
§ 371 (c)(1),
(2) Date: Dec. 11, 2015

(87) PCT Pub. No.: WO2014/198277
PCT Pub. Date: Dec. 18, 2014

(65) Prior Publication Data
US 2016/0123303 A1 May 5, 2016

(30) Foreign Application Priority Data
Jun. 11, 2013 (DK) .................................. 2013 70314

(51) Int. Cl.
*E04D 13/18* (2014.01)
*F03D 7/02* (2006.01)
(Continued)

(52) U.S. Cl.
CPC ............ *F03D 7/0296* (2013.01); *E04B 1/985* (2013.01); *E04H 12/00* (2013.01);
(Continued)

(58) Field of Classification Search
CPC .... F03D 7/0296; F03D 11/0075; F03D 11/04; F03D 80/00; E04B 1/985; E04H 12/00;
(Continued)

(56) References Cited

U.S. PATENT DOCUMENTS

| 4,320,602 A | * | 3/1982 | Richardson | ............... E04B 1/98 454/1 |
| 5,098,226 A | * | 3/1992 | Venugopal | .............. B63B 35/44 405/205 |

(Continued)

FOREIGN PATENT DOCUMENTS

| CN | 101852188 A | 10/2010 |
| CN | 103016609 A | 4/2013 |

(Continued)

OTHER PUBLICATIONS

European Patent Office, International Search Report and Written Opinion issued in International Application No. PCT/DK2014/050164 dated Aug. 19, 2014.

(Continued)

*Primary Examiner* — Basil Katcheves
(74) *Attorney, Agent, or Firm* — Wood Herron & Evans LLP

(57) ABSTRACT

The present invention relates to wind turbine towers and in particular to such towers having a damper for use when erecting the tower and prior to installing a nacelle on the top of the tower. The invention also relates to a method for damping wind turbine towers. One aspect of the invention involves a wind turbine tower (2) with an upper tower structure (24) and a damper (5) comprising, —a liquidless damper housing (7,8) fixed to the upper structure, —a cylindrical interior surface of the damper housing, and —a damper mass having a horizontal extent which is less than a horizontal extent of the cylindrical interior surface of the damper housing, and —at least one shock absorbing struc- (Continued)

ture, where the damper mass is arranged to, when the tower oscillates, essentially stay in a standstill location, whereby a relative movement between the tower and the damper mass may cause an impact with between the tower mass and the shock absorbing structure dependent on the magnitude of the amplitude of the tower oscillation. A main technical progress is that the damper does not need detailed tuning to the towers natural frequency. As long as the damper mass is sufficient, it may be used for damping a range of tower sizes and heights.

13 Claims, 8 Drawing Sheets

(51) Int. Cl.

| | | |
|---|---|---|
| F16F 7/10 | (2006.01) | |
| F03D 80/00 | (2016.01) | |
| E04B 1/98 | (2006.01) | |
| E04H 12/00 | (2006.01) | |
| F03D 11/00 | (2006.01) | |
| F03D 11/04 | (2006.01) | |

(52) U.S. Cl.
CPC .......... *F03D 11/0075* (2013.01); *F03D 11/04* (2013.01); *F03D 80/00* (2016.05); *F16F 7/10* (2013.01); *F05B 2250/231* (2013.01); *F05B 2260/964* (2013.01); *Y02E 10/726* (2013.01)

(58) Field of Classification Search
CPC ........ F16F 7/10; Y02E 10/726; Y02E 10/722; F05B 2250/231; F05B 2260/964
USPC ................................ 52/173.1, 167.2; 290/55
See application file for complete search history.

(56) References Cited

U.S. PATENT DOCUMENTS

| | | | |
|---|---|---|---|
| 8,322,975 B2 * | 12/2012 | Kawabata | F03D 80/00 415/119 |
| 2001/0020761 A1 | 9/2001 | Hasegawa | |
| 2006/0147306 A1 * | 7/2006 | Zheng | F16F 7/10 416/1 |
| 2008/0048069 A1 | 2/2008 | Zheng et al. | |
| 2010/0314883 A1 * | 12/2010 | Ollgaard | F03D 80/00 290/55 |
| 2011/0260465 A1 * | 10/2011 | Pedersen | F03D 1/001 290/55 |
| 2012/0063915 A1 | 3/2012 | Kawabata et al. | |
| 2012/0267207 A1 * | 10/2012 | Kawabata | F03D 80/88 188/379 |
| 2013/0326969 A1 * | 12/2013 | Kienholz | F16F 7/1011 52/167.2 |
| 2014/0301846 A1 * | 10/2014 | Zhu | F03D 7/0296 416/146 R |
| 2015/0211496 A1 * | 7/2015 | Frydendal | F03D 11/04 416/145 |

FOREIGN PATENT DOCUMENTS

| | | |
|---|---|---|
| DE | 2616899 A1 | 10/1977 |
| DE | 3215428 A1 | 11/1983 |
| DE | 4109964 A1 | 10/1991 |
| EP | 2686072 A1 | 1/2014 |
| JP | H04366043 A | 12/1992 |
| JP | 2000027490 A | 1/2000 |
| WO | 2008153489 A1 | 12/2008 |
| WO | 2009068599 A2 | 6/2009 |

OTHER PUBLICATIONS

Danish Patent and Trademark Office, Search Report issued in Application No. PA 2013 70314 dated Jan. 24, 2014.

* cited by examiner

WIND TURBINE TOWER HAVING A DAMPER

FIELD OF THE INVENTION

The present invention relates to wind turbine towers and in particular to such towers having a damper for use when erecting the tower and prior to installing a nacelle on the top of the tower, but which may also be used for otherwise damping the top or other part of the tower. The invention further relates to a method for damping wind turbine towers.

BACKGROUND OF THE INVENTION

In particular tall and slender towers, when being erected or after completed erection, have a tendency to oscillate with high amplitude. The high amplitude is believed to be caused by vortexes from the wind passing around the tower. Apparently this is worsened for high towers, which have a higher portion of the tower being exposed to the wind.

A number of various tower dampers have earlier been proposed, but none which may be removed for reuse in a next tower.

SUMMARY OF THE INVENTION

One aspect of the invention involves a wind turbine tower with an upper tower structure and a damper comprising,
  a liquidless damper housing fixed to the upper structure,
  a cylindrical interior surface of the damper housing, and
  a damper mass having a horizontal extent which is less than a horizontal extent of the cylindrical interior surface of the damper housing, and
  at least one shock absorbing structure,
where the damper mass is arranged to, when the tower oscillates, essentially stay in a standstill location, whereby a relative movement between the tower and the damper mass may cause an impact with between the tower mass and the shock absorbing structure dependent on the magnitude of the amplitude of the tower oscillation.

As no liquid is present in the damper housing, there is no need for pumping equipment to remove the liquid. Also, any accidental spilling of liquid is avoid, which could be detrimental to the environment. Also, the design of the damper is less complex than known dampers. However, a main technical progress is that the damper does not need detailed tuning to the tower eigenfrequency. As long as the damper mass is sufficient, it may be used for damping a range of tower sizes and heights. Generally speaking it is a rule of thumb that 6-8 percent of the mass of a structure is to be dampened. It is to be noticed, that it is not the entire mass of a tower that counts, as one end is fixed to the ground. So a 125 meter high tower only has an effective oscillating mass of 50 tons and has been tested to be sufficiently dampened by a damper mass of only 500 kg, which is only 1 percent of the effective tower mass.

Sufficiently dampened is a mean amplitude about 0.05 to 0.1 meters, which has been dampened from an undampened amplitude between 0.5 meters to 1, meters, i.e. a dampening factor of about 10. Hence, mass savings are obtained, which makes the damping much less troublesome and time-consuming.

The damper mass may include a ball-shaped damper element. Hereby some friction is obtained as well a high inertia. The ball-shaped element may include several pieces, which are put together and fixated by, e.g., screws to form the ball-shape.

The damper mass may include a plurality of mass elements, which makes handling easy and less hazardous.

The damper elements of the wind turbine tower damper may be disc-shaped and comprise a central aperture. As the damper should be able to dampen oscillations in any direction, a disc-shape of the damper elements is beneficial as the disc-shape is rotational-wise symmetric. Hence, it is suited for impact in any horizontal direction. Furthermore, by splitting the damper mass into disc-shaped elements, these may easily be handled and moved up into the nacelle from where they may be lowered by crane, including several disc-shaped elements together.

A central pin may be centrally fixated to a lowermost damper element and a stack of disc-shaped damper elements be arranged on the central pin. This enables easy stacking of disc-shaped damper elements to obtain a desired total damper mass for the wind turbine tower as more elements may be added or some removed.

A shock absorbing structure may comprise a single damping element as well as a plurality of individual shock absorbers.

The damping element may also be disc-shaped and have a larger diameter than the damper elements. In this way the shock absorber may be mounted along with the disc-shaped damper elements on the central pin. As the diameter is larger of the shock absorber than the damper elements, it is ensured that during damping action, the shock absorber will impact with the damper housing to absorb the impact and provide damping action.

In another aspect of the invention, the damper mass may comprise a cylindrical container located inside the damper housing, where the cylindrical container is filled to a predetermined amount with one or more elements selected from a group comprising sand, metal granulate, metal pellets and metal balls. This also enables an easy way of providing damper elements to obtain a desired total damper mass for the wind turbine tower as more elements may be added or some removed. Also, additional damping may be obtained from internal friction between the damper elements during impact with the damper housing.

Also, a shock absorbing structure may be arranged along the interior surface of the damper housing, such that a stack of disc-shaped damper elements or the cylindrical container may impact with the shock absorbing structure. Hence, the damper housing may be used both for the damper structure with the disc-shaped damper elements as well as for the version with the cylindrical container filled with a predetermined amount with one or more elements selected from a group comprising sand, metal granulate, metal pellets and metal balls.

Moreover, in another aspect the shock absorbing structure may be arranged along an outside of the cylindrical container of the damper mass. It is most often easier to arrange items like the shock absorbing structure on the outside, rather than the inside of a cylindrical surface, as a shock absorbing structure is often elastic and may hence be made with a slightly less diameter the cylindrical interior housing to allow an elastic circumferential stress fit.

Instead of the tower just oscillating relative to the damper mass, which in effect may be regarded as the damper mass moving from side to side in the damper housing, the damper mass may be supported by at least three fixated roller ball wheels allowing the damper mass to move in any horizontal direction with low friction. The lower friction may cause the damper to act more quickly and hence dampen only minor tower oscillations. On the other hand, letting the damper mass slide from side to side adds to the damping function due to the friction between the damper mass and an interior bottom of damper housing.

Other aspects of the invention will be apparent from and elucidated with reference to the variations described hereinafter, where features may be added to the core of the invention and/or replaced by alternative features.

BRIEF DESCRIPTION OF THE FIGURES

A wind turbine having a wind tower with a wind tower damper according to the invention will now be described in more detail with regard to the accompanying figures. The figures show one way of implementing the present invention and is not to be construed as being limiting to other possible embodiments falling within the scope of the attached claim set.

DETAILED DESCRIPTION OF THE INVENTION

Figure 1:
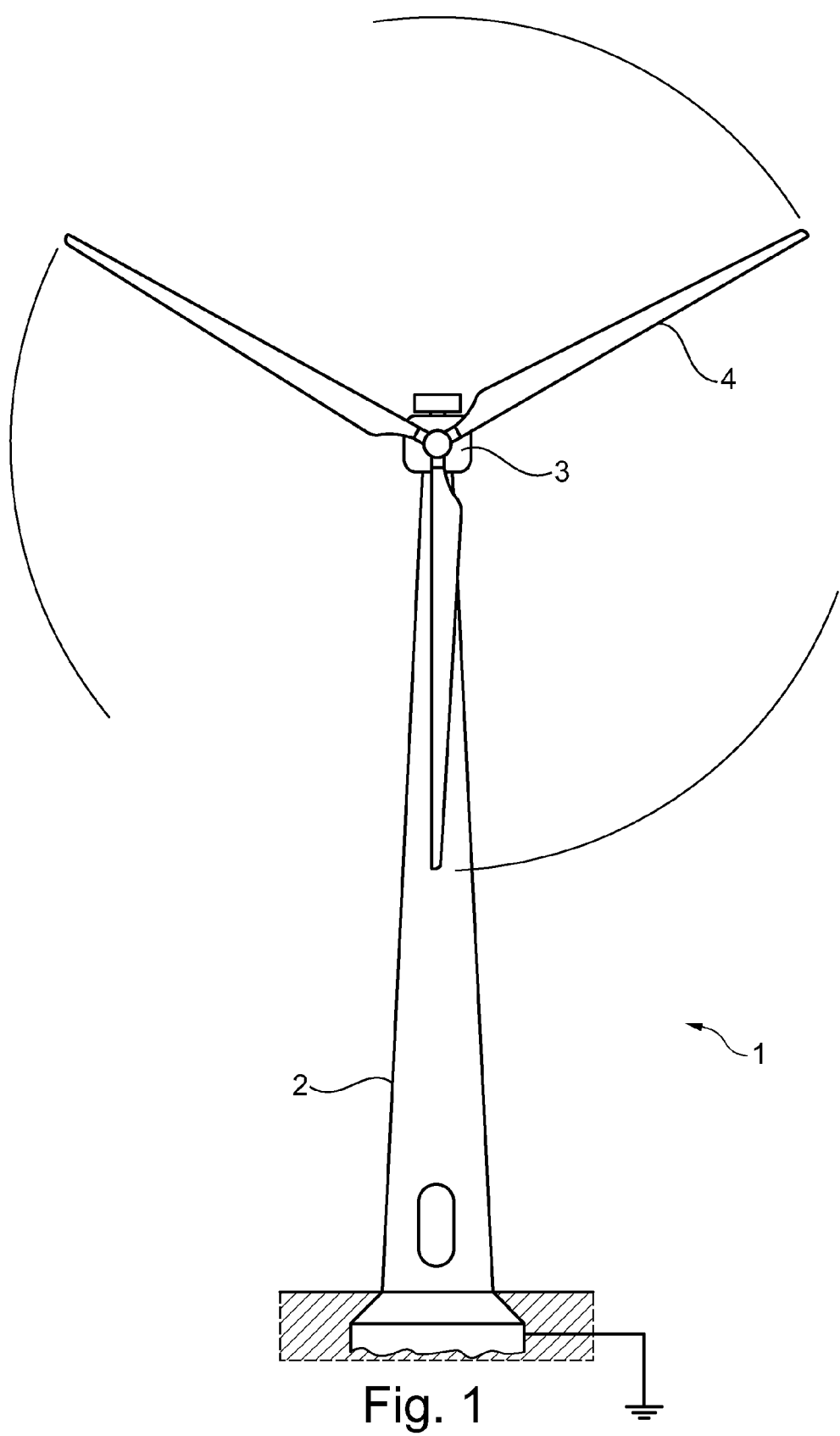
FIG. 1 displays a state of the art wind turbine 1 of a known type. The wind turbine is displayed as facing an upwind direction FIG. 2 displays a tower 2 for a state of the art wind turbine FIG. 3 displays a cross section of a tower oscillation damper 5 according to the invention FIG. 4 displays a cross section of a tower oscillation damper 5 according to the invention, where another type of damping arrangement is used FIG. 5 displays a cross section of a tower oscillation damper 5 according to the invention, where another type of mass for damping is used FIGS. 6 and 7 displays cross sections, according to cross section A-A of FIG. 4, of a tower oscillation damper 5 with different types of damping arrangements FIG. 8 displays to scale (approx. diameter 5 meters and height approx. 150 meters) the slenderness of a relatively high tower with relatively low diameter, where oscillation damping may be required FIG. 9 displays a cross section of a tower oscillation damper 5 according to the invention, where another type of damping arrangement is used, where a friction ring is incorporated FIG. 10 displays a cross section of a tower oscillation damper 5 according to the invention, where another type of damping arrangement is used, where the damping mass is ball-shaped

FIG. 1 displays a state of the art wind turbine 1 of a known type. The wind turbine has a tower 2, which primary objective is to support a nacelle 3 and provide access to the nacelle using not shown ladders or an elevator arranged inside the tower. Also not shown are power cables etc. arranged inside the tower 2 along with not shown platforms. Blades 4 are connected to the nacelle 3 for producing power.

Figure 2:
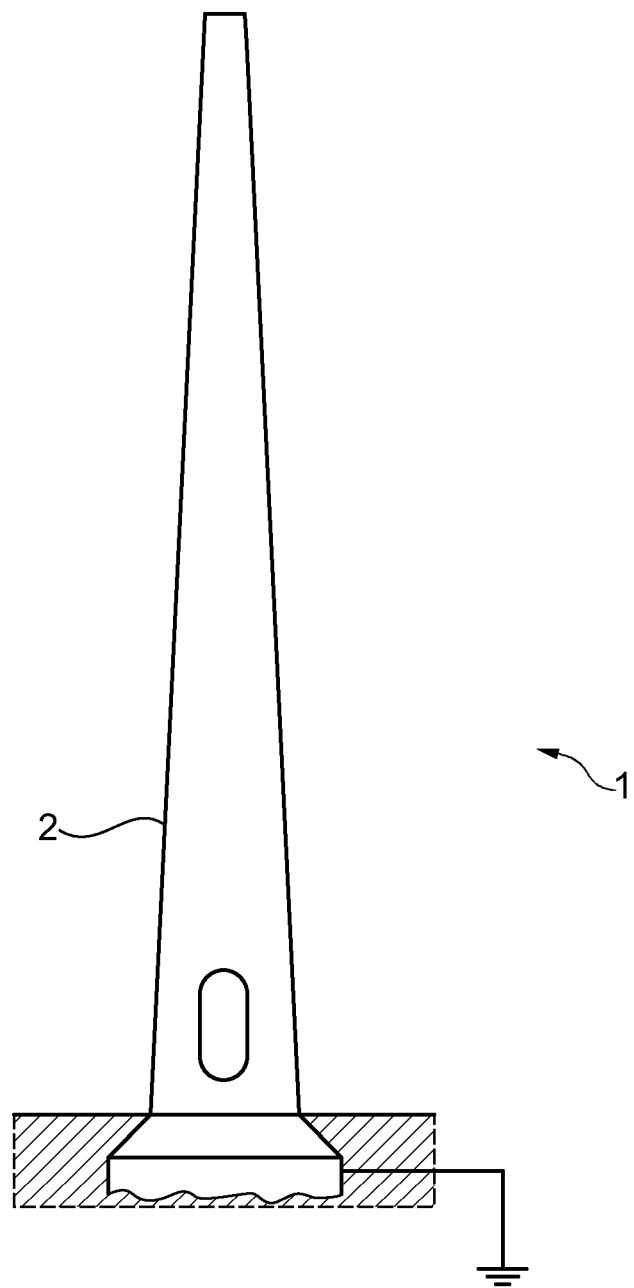
Figure 8:
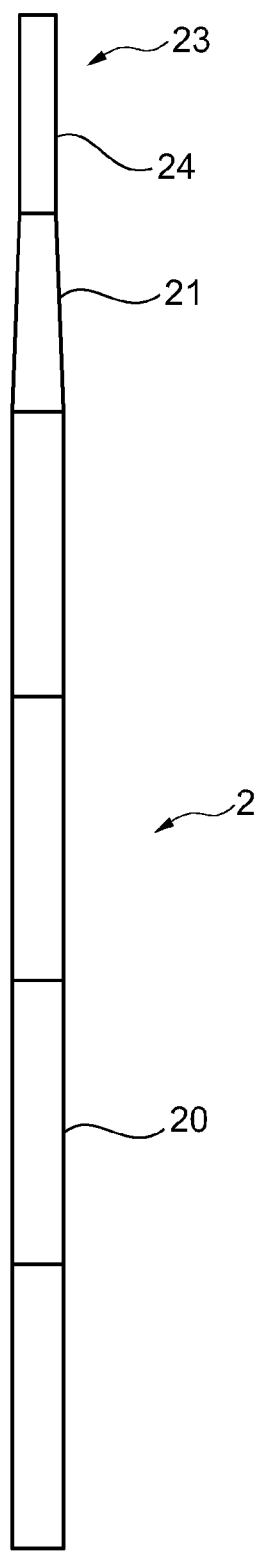

FIG. 2 displays the wind turbine 1 with a tower 2 during installation or dismantling. In this state, where at least the nacelle and possibly the blades are not present, a long and slender tower, as shown in FIG. 8, with cylindrical tower sections 20 and conical tower sections 21, the is an increased risk of wind induced tower oscillations with high amplitude. This means, that when attempting to mount a nacelle 3, this may not be possible. And vice versa, dismantling of a nacelle 3 the tower 2 may start oscillating creation hazards for personnel removing the last bolts connecting the nacelle 3 to the tower 2. After the nacelle 3 is removed, a following removal of one or more upper tower sections may also cause hazards, due to large amplitude oscillations of the tower 2.

Figure 3:
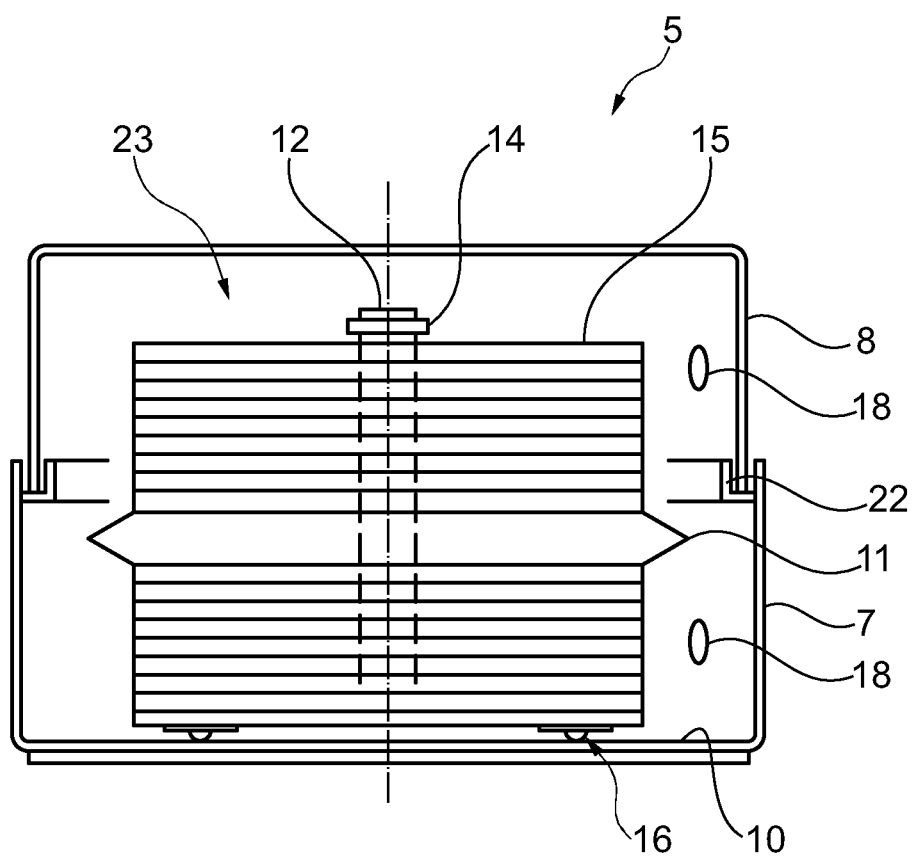

FIG. 3 shows a cross section of a tower damper 5, which in general is rotationally symmetrical. The damper 5 comprises a bottom 10 of a lower housing 7. The lower housing having at its upper edge a ring element 22 with a V-shaped cross section, where the lower housing 7 and the ring element 2 provides a reception opening for receiving an upper housing 8. Both the lower hosing 7 and the upper housing 8 comprise lifting holes 18 as housings may be too heavy for human handling. The tower damper 5 is fixed in an uppermost tower section 24, cf. FIG. 8, of the tower 2.

Inside the lower housing 7 and the upper housing 8 there is room for a mass element 23, which may be configured in various alternative ways as well as a damping element 11 made from a rubber or rubber-like material. In the shown configuration, the mass 23 comprises a number of discs 15 having a central aperture, such that the discs 15 may be arranged and fixed by a central shaft 12 and be secured by a lock 15. The shaft 12 may be welded or bolted to a lowermost disc 15. The discs 15 are preferably made with a mass, where one or two humans may handle the discs for assembling and disassembling the tower damper 5. Also, the damping element 11 may be arranged on the shaft 12 between the discs 15. In another configuration some of the discs may have a smaller diameter, so that the damping element 11 may have a ring-shaped form, where the discs 15 with the smaller diameter may provide a recess for receiving a ring-shaped damping element.

Although not shown, the damping element 11 may be fixated in a ring-like shape to the bottom housing 7 instead.

The lowermost disc 15 is shown in a configuration having roller ball wheels 16, so that the mass element 23 may move freely in any horizontal direction inside the housings 7, 8, when the tower is oscillating along with the housings. In an alternative configuration the wheels 16 may be dispensed with, so that the mass element 23 slides instead of rolling on the wheels.

When initially the tower 2, in a first oscillation, moves westward, the damping mass 23, initially placed centrally in the damper housing, will collide with the damper housing at the eastside. When the tower 23 later starts moving eastward, the damper housing will move with the tower 2 to the east. However, by then the mass element with and the damping element 11 will collide with the damper housing to the west and the inertial energy of the mass element 23 will restrict the towers 2 movement to the east and vice versa. Also some of the towers 2 oscillation energy will be absorbed be the deformation of the damping element 11. The damper 5 will continue working and provides a certain minimum amplitude of the tower 2 oscillation. A dampening factor about 10 may be obtained by such a tower damper.

Figure 4:
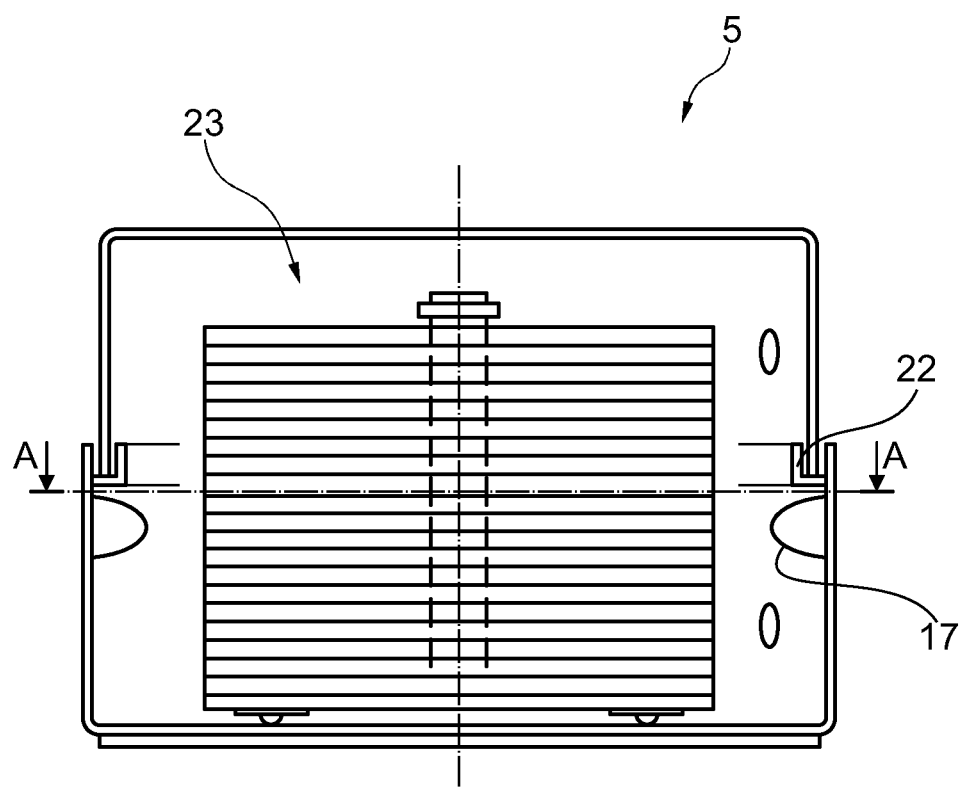

FIG. 4 is essentially similar to FIG. 3, except that the damping element 11 has been replaced by a number of shock absorbers 17. The cross section A-A is later used in FIGS. 6 and 7. The shock absorbers have the same function as the damping element 11, i.e. to make the collision between the damping element 23 and the housing more gently. Hereby distortion or breakage of the housing is avoided, or at least the housing may be made lighter. Also noise from collisions between the mass element 23 and the housing are reduced.

Figure 5:
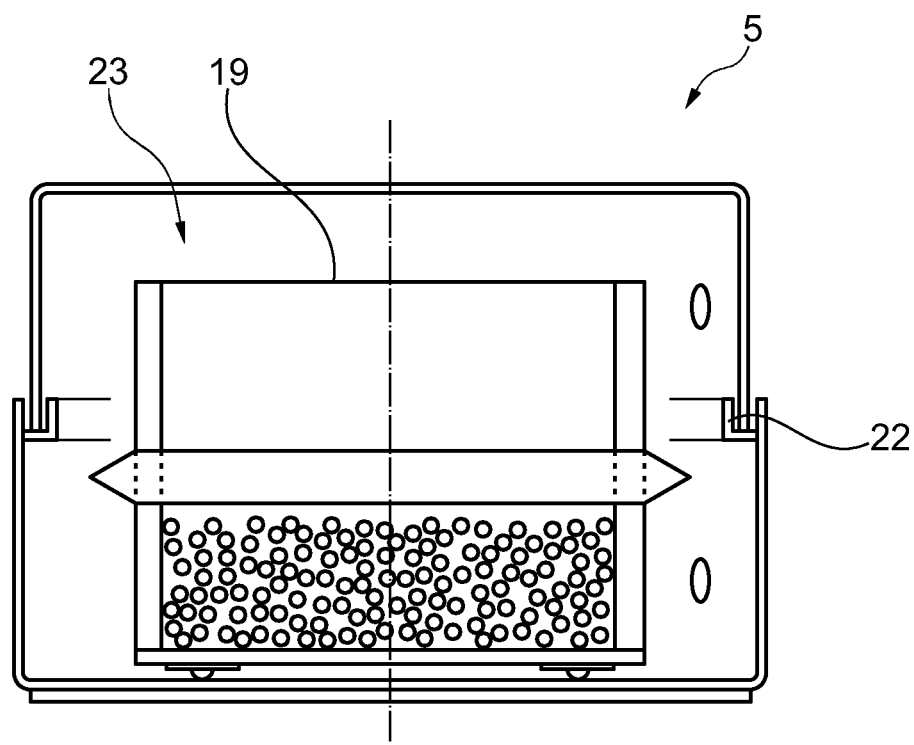

In FIGS. 3 and 4 the damper mass 23 are shown as discs 15. This has two benefits, that each disc may be handled by one or two persons and that the damper mass is easily changed, more or fewer discs 15 may be used, so that the tower damper 5 is optimally tuned to a given tower 2. The same is obtained alternatively in FIG. 5, where instead of discs 15 the damper mass is a cylindrical container filled with sand, small metal pellets or balls normally used for ball bearings. The container-like damper mass has a lid 19, so that the content may not escape. The configuration of FIG. 5 result in increased damping, as when the damper mass 23 collides with the housing, addition damping may take place because e.g. pellets will move relative to each other and cause damping by the friction between the e.g. pellets.

Figure 6:
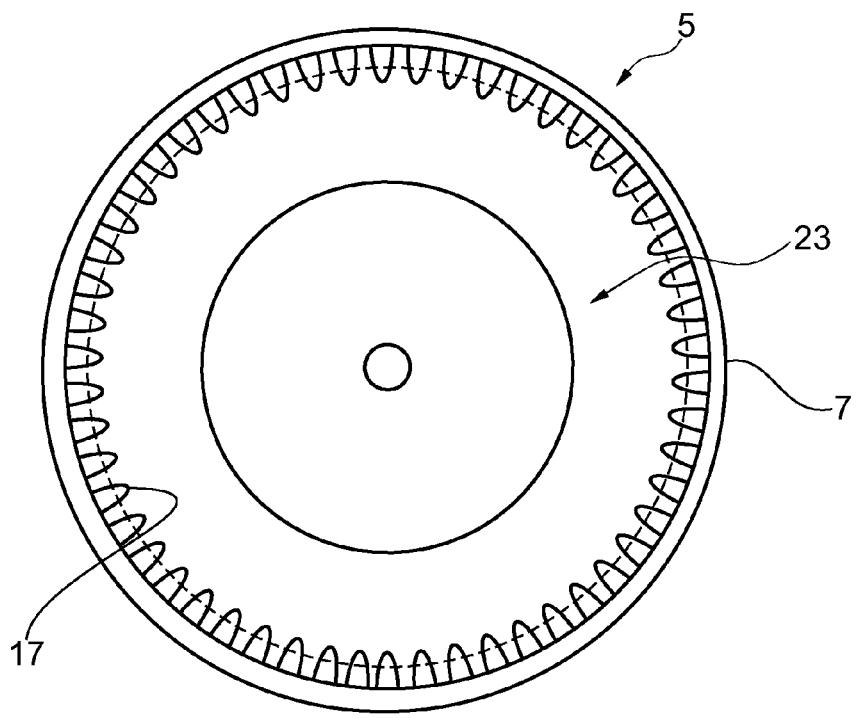
Figure 7:
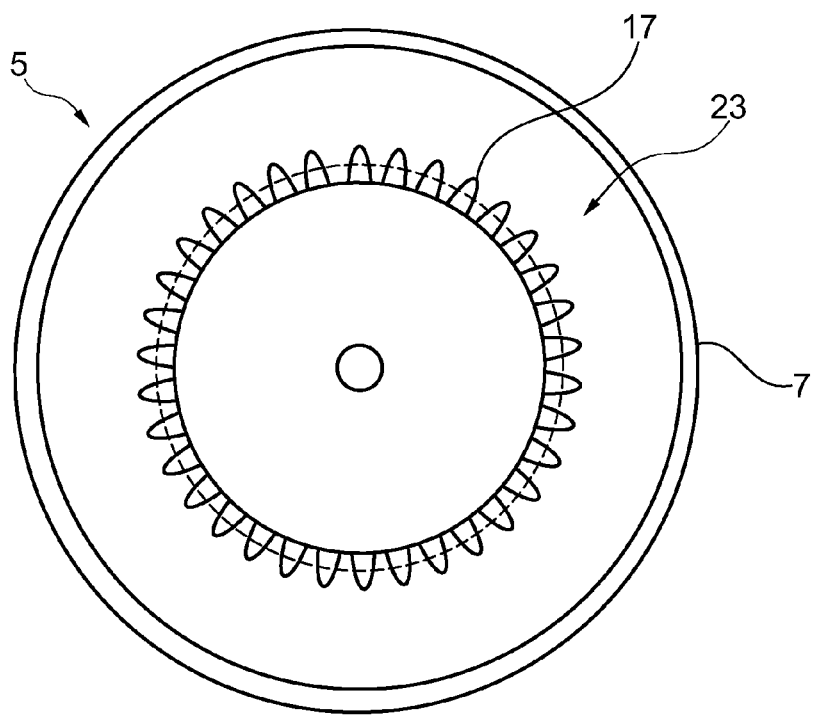

In FIGS. 6 and 7, which show a cross section A-A according to FIG. 4, however in alternative configurations. In FIG. 6 a number of shock absorbers 17 are arranged along the inside of the damper housing 7 to absorb collisions of the damper mass with the housing 7. In Fig. the shock absorbers 17 are alternatively arranged on the damper mass 23 instead of on the housing.

FIG. 8 displays a wind turbine tower 2 having cylindrical sections 20 and conical section 21.

Figure 9:
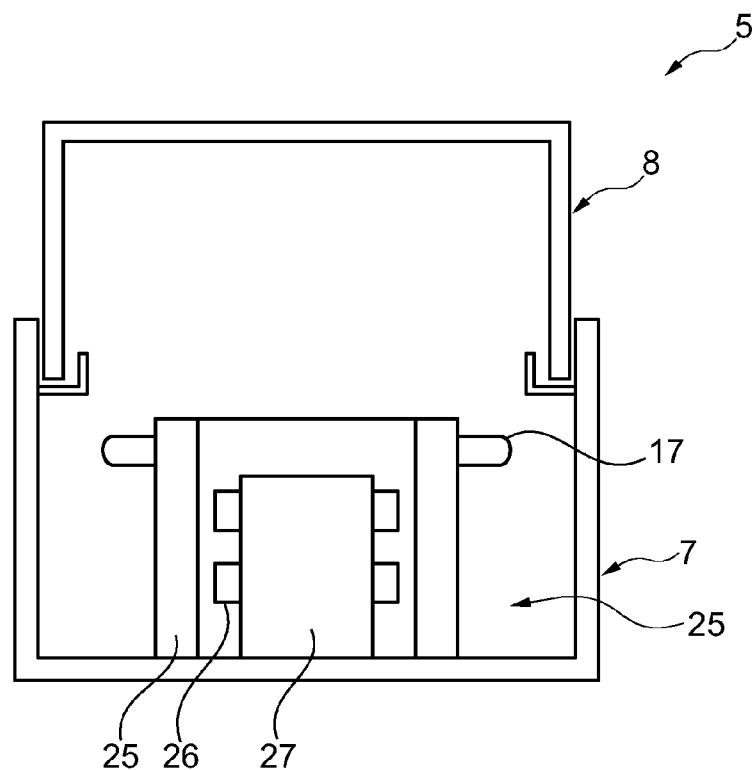

FIG. 9 displays damper housings 7,8, where a shock absorber arrangement 17 is arranged along an exterior side of a column-shaped damping mass 27. Outside the friction element is arranged a ring-shaped damping mass 25. To keep the damping mass from tilting stability elements 26 are arranged on an exterior side of the friction element 27. Of course, the stability elements 26 could as well have been located on the interior side of the damping mass 25.

Figure 10:
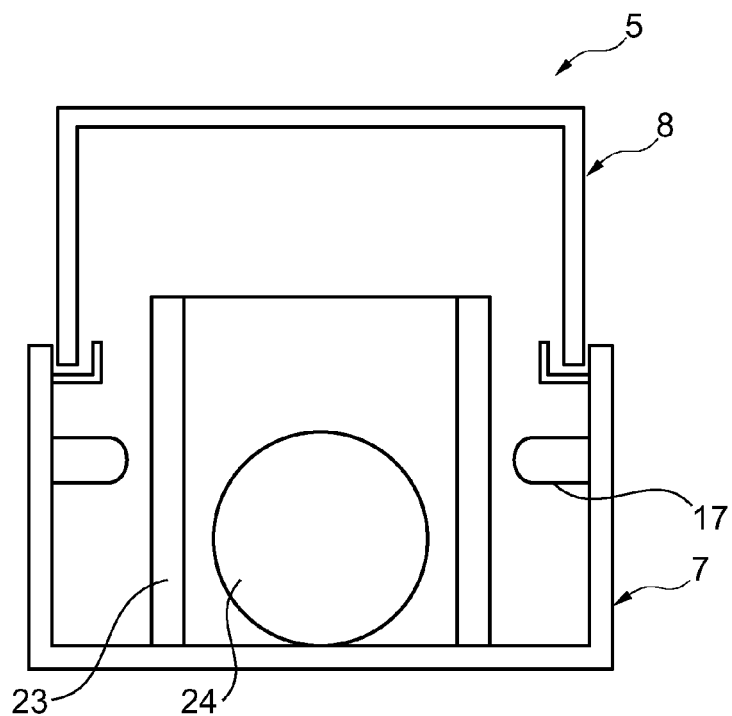

FIG. 10 shows a ring-shaped friction element 23 having a ball-shaped damping mass located inside. A shock absorbing arrangement 17 is arranged inside the lower housing 8.

In both FIGS. 9 and 10 the concepts are that when the tower oscillates the housing 8 being fixed to the tower will oscillate with the tower and thereby cause a collision with the friction elements 23, 27, which, when the amplitude is sufficient, will cause the a collision with the damping mass 25, 24 and eventually impact with the shock absorbing arrangements 17 to dissipate energy. Both energy by deforming the shock absorbing arrangements, but also by moving the friction element causing heat and energy dissipation as well as causing the damping elements to move out of tune with the tower oscillation and thereby dissipate energy by transforming kinetic energy from the tower to acceleration and inertia of the damping mass.

EXAMPLE

A tower having a tower damper according to FIG. 10 for a MW wind turbine for wind class IEC IIIa with a hub height of 119 meters including five sections, three cylindrical lower sections having a diameter about 3900 mm and wall thickness ranging from 60 mm at the bottom and down to about 24 mm. The two upper sections range from a diameter of 3900 to about 3200 mm and a wall thickness ranging from 23 mm and down to 13 mm, and then at the uppermost part at 20 mm. The total height is about 116 meters.

The weight of each section is, starting from the bottom and going upwards:
1. Bottom section 70 ton
2. 69 ton
3. 70 ton
4. 57 ton
5. Top section 41 ton Calculation of damping effect:
Damping mass of ball shaped damper, m=500 kg
Oscillation mass of tower without nacelle, Mt=39500 kg
Stiffness of the equivalent single mass (tower) system, Ct=269000 N/m
Natural frequency of the tower system, $fo=\frac{1}{2}\pi*\sqrt{(C/Mt)}=$ 0.4 Hz
Tower diameter at ¾ height, Dt=3.5 m
Critical wind velocity, Vcr=fo*Dt/0.18=8.1 m/sec
Critical wind pressure, $Qcr=\frac{1}{2}*1.25*Vcr^2=41$ N/m$^2$
Vortex load, wcr=0.20*Dt*Qcr=28.8 N/m
Resultant of vortex load on upper tower half, Wcr=wcr*119/2=1714 N
Deflection of equivalent top mass, Δt=Wcr/Ct=0.00637 m
Energy per half period, $Ew=\frac{1}{2}*Ct*\Delta t^2=5.460$ Nm
Friction ring mass m=20 kg
Coefficient of friction between friction ring and housing bottom, μ=0.40
Resulting minimum distance between ball-shaped mass and housing wall, including spacing taken up shock absorbers, Δ=Ew/(9.82*m*μ)=0.069 m It is believed that a similar tower damper will have a similar technical effect, as long the lowest natural frequency is 1 Hz or lower. This will of course rely on further tests, but a damping mass between 200 and 600 kg should cover steel wind turbine tower in lengths from 60 meters and above.

The tower damper described herein, may preferably be used in a location near or at the top of the tower. However, one or more further dampers of a similar type may be used at lower locations, such as midway between the tower top and bottom to dampen higher order natural frequencies.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wind turbine tower with an upper tower structure and a damper, comprising
   a liquidless damper housing fixed to the upper tower structure, the damper housing having a substantially flat bottom section,
   a cylindrical interior surface of the damper housing,
   a damper mass contained within the damper housing and having a horizontal extent which is less than a horizontal extent of the cylindrical interior surface of the damper housing, and
   at least one shock absorbing structure contained within the damper housing and configured to absorb shock between the damper mass and the damper housing, wherein a tower oscillation including a relative movement between the tower and the damper mass causes an impact between the damper mass and the damper housing and the impact is absorbed by the shock absorbing structure dependent on the magnitude of the amplitude of the tower oscillation.

2. The wind turbine tower according to claim 1, where the damper mass comprises at least one ball-shaped damper element.

3. The wind turbine tower according to claim 1, where the damper mass comprises a plurality of damper elements.

4. The wind turbine tower according to claim 3, where the damper elements are disc-shaped and comprise a central aperture.

5. The wind turbine tower according to claim 4, where a central pin is centrally fixated to a lowermost damper element and a stack of disc-shaped damper elements are arranged on the central pin.

6. The wind turbine tower according to claim 4, where the shock absorbing structure is disc-shaped and attached to the damper mass and has a larger diameter than the at least one damper element.

7. The wind turbine tower according to claim 1, where the damper comprises a damper mass with a cylindrical container located inside the damper housing, where the cylindrical container is filled to a predetermined extent with one or more elements selected from a group comprising sand, metal granulate, metal pellets and metal balls.

8. The wind turbine tower according to claim 1, where the shock absorbing structure is arranged along the interior surface of the damper housing, such that damper mass or the cylindrical interior housing may impact with the shock absorbing structure.

9. The wind turbine tower according to claim 1, where the shock absorbing structure is arranged along an outside of the damper mass.

10. The wind turbine tower according to claim 1, where the damper mass is supported by at least three fixated wheels allowing the tower to oscillate relatively to the damper mass with low friction.

11. A method of assembling a wind turbine having a tower and a nacelle configured to be coupled to the tower, the method comprising:
    erecting the tower, wherein the tower has an upper tower structure,
    providing a damper having a liquidless damper housing, a cylindrical interior surface of the damper housing, a damper mass contained within the damper housing and having a horizontal extent which is less than a horizontal extent of the cylindrical interior surface of the damper housing, and at least one shock absorbing structure contained within the damper housing, and
    prior to installing the nacelle, fixing the damper housing to the upper tower structure so as to dampen oscillations of the wind turbine tower, wherein a tower oscillation including a relative movement between the tower and the damper mass causes an impact between the damper mass and the damper housing and the impact is absorbed by the shock absorbing structure dependent on the magnitude of the amplitude of the tower oscillation.

12. The method according to claim 11, further comprising installing the nacelle on the tower with the damper operating to dampen the oscillations in the wind turbine tower.

13. The method according to claim 12, further comprising disassembling the damper from the tower essentially using human power so as to remove the damper from the wind turbine.

* * * * *